Sept. 10, 1963     E. E. HOWE ETAL     3,103,376
STEERING SUSPENSION
Filed Aug. 19, 1958

INVENTORS
EARL E. HOWE
RICHARD W. HOWE
BY
Horton, Davis, Brewer & Brugman
ATTORNEYS 3,103,376
STEERING SUSPENSION
Earl E. Howe, 6101 N. Sheridan Road, Chicago, Ill., and Richard W. Howe, 220 Can-Dota, Mount Prospect, Ill.
Filed Aug. 19, 1958, Ser. No. 755,982
5 Claims. (Cl. 287—90)

This invention relates to a steering suspension end joint and particularly to an improved end joint which is relatively friction free, inexpensive to manufacture and assemble, and durable in use.

It is important to reduce the effort of steering automotive vehicles and to this end low friction joints employed in a steering mechanism are highly desirable. Ball bearing end joints on tie rods and wheel suspenssions have been used as low friction joints very successfully and it is an object of this invention to provide an improved ball bearing end joint for a tie rod and wheel suspension.

In an automobile, the wheel and brake drum assembly is usually connected to the body through a spring so that the vertical motion due to road bumps is absorbed by the wheel and spring assembly while the main body of the vehicle travels rather smoothly without, or with substantially less, vertical motion. Since the steering suspension is connected to the steering wheel assembly at one end, and to the wheel and brake drum assembly at the other, the relative vertical motion between these two assemblies must be absorbed by the steering suspension assembly particularly the end joints therein.

In the usual steering suspension assembly, the tie rod and steering knuckles move back and forth in a horizontal plane in adjusting the position of the wheels, and therefore, the rotation of end joints is largely in a horizontal plane. It is however, necessary for end joints to have limited universal action so that the vertical motion of the wheels may be absorbed without transmitting this motion through the steering suspension to the steering wheel. An ordinary ball bearing which consists of a unitary assembly of balls, a race and a cage is incapable of accommodating a universal movement. It is one object of this invention to employ a specially formed ball bearing connection in a steering suspension end joint that is capable of a universal movement, and this object is accomplished by employing the internal cavity of an end joint socket as the cage for the ball bearing.

The structural strains on an end joint are very severe and in order to withstand them it is necessary to construct end joints of extremely tough, high tensile-strength material. On the other hand, when employing the socket of an end joint as a ball bearing cage, it is necessary to provide hard, wear resistant material for the balls to roll on. Since wear resistant materials are ordinarily birttle rather than tough, it is necessary to have two inconsistent qualities in the same material, namely toughness to resist shock and hardness to withstand wear. Prior devices of this nature either employ a cage for the ball bearings or an insert into the cavity of the end joint socket. Employing a cage prevents universal movement of the joint while employing inserts requires precision machining both of the cavity and of the insert, and a difficult job of assembly. It is another object of this invention to specially treat a tough ductile socket to locally produce an extremely hard and wear resistant surface on the cavity of the socket.

The severe vertical motion produced by road bumps results in a thrust strain on the bearings of the end joint and produces vibratory motion which causes rattles and loosening of threaded connections. It is another object of this invention to construct an end joint with a combination thrust bearing and spring which both retains axial loads and eliminates rattles by urging the ball bearing tightly into its socket.

Ordinary end joints in steering suspension have large surfaces in sliding contact. Even though there is not a great deal of relative movement between parts, there is high friction that results in hard steering. Also, frequent lubrication is required to maintain fairly easy manipulation. Usually manufacturers recommend lubrication every 1000 miles. It is another object of this invention to provide an end joint for a steering suspension that requires very infrequent lubrication and in fact may be permanently lubricated for the life of the vehicle during assembly.

Other objects of our invention are to produce an end joint which requires no adjustment in assembly, which is constructed with a permanent shake-proof closure, and which is inexpensively manufactured with minimum machining.

Other objects and advantages of our invention will be apparent from the following description, and drawings, in which.

Figure 1:
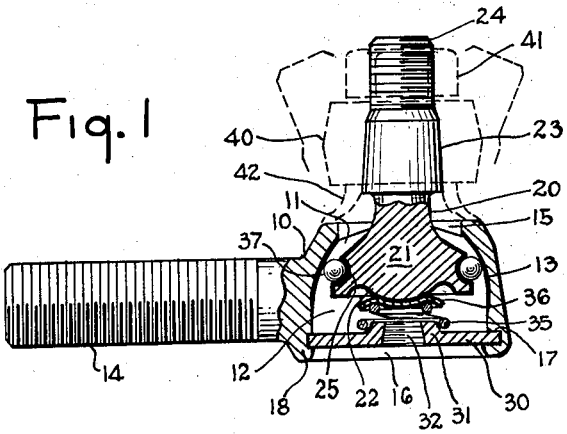
FIG. 1 is a partial sectional elevation view of one embodiment of our invention.
Figure 2:
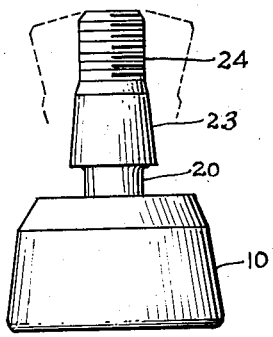
FIG. 2 is a right side view of FIG. 1.
Figure 3:
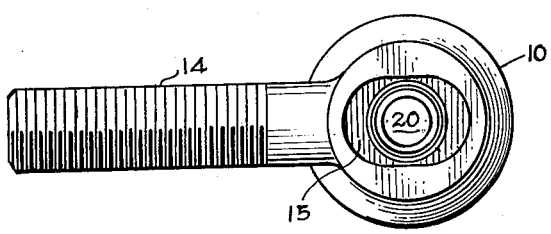
FIG. 3 is a plan view of FIG. 1.

The drawings will be described in relation to a tie rod end joint for purposes of illustration, however, it is not intended to limit this invention to tie rod end joints, but to include wheel suspension end joints, steering knuckle end joints and others.

The end joint of this invention consists of three major parts, a socket member 10, a stud member 20, and a closure member 30. Socket member 10 consists of a wall that forms a cavity which is partially a cylindrical cavity 12 and partially a spherical cavity 11. The spherical portion of the cavity has hardened walls 13 which are produced after forming and are integral with the high strength steel from which the cavity is formed. The walls are locally surface-hardened on their interior surface by electrical induction, nitriding, or other heat and chemical treatments. Socket member 10 has an enlarged opening 16 and a restricted opening 15 and it is constructed with an abutment 17 and, in final assembly, with a lip 18 lapping over and holding closure member 30 in place. Enlarged opening 16 is circular and of substantially the same size as the cylindrical portion 12 of the cavity while restricted opening 15 may be circular but is preferably oval in shape to provide more universal action in one direction than in another. Threaded arm 14 is for connecting the socket member, and in fact the entire end joint, to a tie rod.

Stud member 20 is for the purpose of connecting the tie rod and end joint to the wheel assembly of the vehicle. It consists of a spherical terminal portion 22 and laterally extended portion 21 which is of a diameter that will pass through enlarged opening 16 but will not pass through restricted opening 15. The laterally expanded portion 21 contains a race 25 suitable for containing balls 37, to bear against the internal cavity of socket member 10.

Spherical portion 22 and laterally expanded portion 21 preferably are symmetrical about the axis of stud member 20. The portion of stud member 20 which is adapted to connect to a steering knuckle is of such a diameter that it will pass through the restricted opening 15 and protrude from the top of socket member 10. In this embodiment, showing the ordinary method for connection, smooth tapered portion 23 projects from the socket member and is adapted to be encircled by the terminal portion of a steering knuckle. A threaded portion 24 protruding above tapered portion 23 is for the purpose of holding a retaining nut, shown in phantom as 41, which maintains the steering knuckle, shown in phantom as 40, tightly on tapered portion 23 in snug, rattle-free, sliding contact therewith.

Closure member 30 is preferably a simple head-like member shown in this embodiment as a flat plate which is adapted to abut against abutment 17 and be sealed by rolling lip 18 around the periphery of member 30 to hold it snugly and permanently in place. In the embodiment shown, closure member 30 contains a central hole 32, with threads adapted to accept a grease fitting. The interior of this hole contains a small protrusion 31 for holding a spring in the center of the closure member; however, the spring may be held by an indentation or other suitable contour. Pressure cap 36 which rests on the upper portion of spring 35 provides a contact with spherical portion 22 of the stud member of the assembly.

Pressure cap 36 and spring 35 are in a position such that, if they were not restrained by stud member 20, they would be above the center of spherical cavity 11. The dimensions of laterally expanded portion 21 and balls 37 are such that the periphery of spherical portion 22 is at the center of the spherical portion 11 of the cavity in socket member 10. Therefore, balls 37 are urged snugly into spherical cavity 11 so that they are constantly in contact with the induction hardened portion 13 of the internal wall of the cavity. Spring 35 and pressure cap 36 thereby eliminate rattles due to loosening during the operation of the joint and create a thrust bearing effect for axial movement of stud member 20. In addition, the universal movement of stud 20 will be effected through balls 37, which may move in both horizontal and vertical planes thus providing a ball bearing joint both for steering and for absorbing road shocks. This universal movement will cause a slight rolling of spherical portion 22 on pressure cap 36 rather than a sliding contact. As a result no precision machining is required. Pressure cap 36 may be a stamped member which may have any reasonably smooth surface contours and any reasonable hardness and still be an entirely satisfactory member of the assembly. Similarly, spherical portion 22 of the stud member 20 need not be precision machined but may have a surface only as good as forging will produce. As a matter of fact, the assembly of the subject invention needs very little machine work since the general contours of the socket member, the stud member, and the closure member may all be stamped or forged. The internal surface of the socket member, where the balls 37 bear, requires only a coining operation to provide a smooth enough socket to produce the desired result, and the other portions of the assembly require only threading, and the machining operations of final assembly. Furthermore, by use of abutment 17 and a sealing lip 18, an assembly method which is inexpensive and one requiring little skill may be employed. For example, as long as the spherical portion 22 of stud member 20 is forged so that its periphery falls approximately at the center of spherical cavity 11, and the length of spring 35 places pressure cap 36 higher than the center of spherical cavity 36, the various elements of the assembly will automatically adjust to the proper position relative to each other by the simple act of assembling them with closure 30 tight against abutment 17 and no other adjustment need be made to provide a shakeproof, rattle-free bearing with horizontal and universal bearing action which is capable of absorbing axial thrust.

The ball bearing end joint of our invention, in addition to substantially reducing the amount of effort required to operate a joint, reduces or eliminates the lubrication requirements for joints. The small amount of relative motion between the various elements of this assembly in conjunction with the provision of rolling friction in all directions of relative motion, reduces the lubrication requirements of the joint to the extent that packing it with grease during assembly is sufficient lubrication for the life of the joint. A grease fitting may be provided for joints that are employed under severe conditions, such as in extremely dusty locations or when frequently submerged in water.

In addition to surface-hardening the internal spherical cavity of socket member 10, it is also necessary to surface-harden the races in member 20 in which balls 37 are disposed. It is also desirable but not necessary to harden spherical portion 22 of the stud member and pressure cap 36. An upper closure such as a felt washer may be employed to cover restricted opening 15 and a flexible collar-like member, such as shown in phantom at 42, which also seals against the steering knuckle, may be employed for this purpose as well as any equivalent device. There, of course, may be many variations and modifications of our tie rod end joint. These may include, but are not limited to employing socket members with various means for attaching to tie rods, the use of variously shaped restricted openings in the socket members, the use of dished or other shaped closure members, the use of springs other than coil springs or different contours of pressure caps or closure members to maintain the springs in position. It is intended that these and other equivalent modifications and alterations are included within the broad scope of the invention.

We claim as our invention:

1. A ball-bearing end joint comprising in combination a socket member formed from a single piece of metal, a stud member, a spring, a pressure cap and a closure member; said socket member having a circular enlarged end opening and a restricted end opening both symmetrical about an axis and connected by a cavity symmetrical about the same axis, said cavity having an internal cylindrical surface adjacent said enlarged opening and an internal spherical surface adjacent said restricted opening with the latter surface being locally surface-hardened, an abutment near said enlarged opening engaged with said closure member and first means adapted to connect said socket member to the end of a tie rod; said stud member having a partially spherical terminal section adjacent to and integral with a laterally enlarged section which is grooved with a ball race that contains balls in contact with said internal spherical surface and holding said spherical surface out of contact with said stud member, and second means adapted to engage a steering knuckle protruding from said laterally enlarged section through said restricted opening; said closure member comprising a round head-like piece adapted to enter said enlarged opening and abut said abutment, and having a central contour engaging said spring which urges said pressure cap against said spherical terminal section.

2. The end joint of claim 1 further characterized in that said restricted opening is elongated.

3. The end joint of claim 1 further characterized in that it connects a tie rod to a steering knuckle and said restricted opening is related to the diameter of said second means adapted to engage the steering knuckle to provide a universal action of 45° in a plane parallel to said first means for attaching the tie rod and 25° in a plane perpendicular to said first means for attaching to a tie rod.

4. The end joint or claim 1 further characterized in that said closure means is permanently held in contact with said abutment by an overlapped portion of the terminal portion of said enlarged opening.

5. The end joint of claim 1 further characterized in that said central contour and pressure cap are placed to hold the periphery of said spherical section at the center of said internal spherical surface when said stud member is centered in said restricted opening.

References Cited in the file of this patent

UNITED STATES PATENTS

| | | |
|---|---|---|
| 1,845,697 | Baker | Feb. 16, 1932 |
| 2,048,803 | Marles | July 28, 1936 |
| 2,206,972 | Niles | July 9, 1940 |
| 2,298,544 | Ulinski | Oct. 13, 1942 |
| 2,645,510 | Booth | July 14, 1953 |
| 2,733,085 | Latzen | Jan. 31, 1956 |
| 2,754,141 | Latzen | July 10, 1956 |